United States Patent [19]
McKenna

[11] 3,871,173
[45] Mar. 18, 1975

[54] CONSTANT CHAMBER PRESSURE THROTTLING INJECTOR

[75] Inventor: Ronald F. McKenna, Rockford, Ill.

[73] Assignee: The United States of America as represented by the Secretary of the Navy, Washington, D.C.

[22] Filed: Mar. 24, 1970

[21] Appl. No.: 24,897

[52] U.S. Cl................ 60/258, 60/271, 60/267
[51] Int. Cl.............................................. F02k 9/02
[58] Field of Search.......... 60/258, 39.74, 253, 254

[56] References Cited
UNITED STATES PATENTS

| | | | |
|---|---|---|---|
| 3,192,714 | 7/1965 | Hickerson............................ | 60/230 |
| 3,234,731 | 2/1966 | Dermody et al..................... | 60/200 |
| 3,451,222 | 6/1969 | Kelley.................................. | 60/258 |

*Primary Examiner*—Samuel Feinberg
*Attorney, Agent, or Firm*—R. S. Sciascia; T. Watson; E. Sutton

[57] ABSTRACT

A rocket engine having an injector assembly consisting of a throttle piston and deflector plate, which varies the propellant flow rate, coupled to a central throat pintle, which simultaneously varies the throat area of the exhaust nozzle, in order to maintain a cosntant pressure in the combustion chamber for all degrees of throttling. As the injector throttle piston moves aft to reduce the propellant flow by reducing the area of the orifices through which both the fuel and oxidizer pass, the throat pintle moves forward to reduce the throat area of the nozzle. This joint movement of the throttle piston and throat pintle causes a thrust fall-off without any change in the combustion chamber pressure. The rocket engine also has a thrust chamber made of a composite design of materials which can withstand the high temperatures and pressures resulting from the combustion of higher energy propellants.

7 Claims, 2 Drawing Figures

INVENTOR.
RONALD F. McKENNA

CONSTANT CHAMBER PRESSURE THROTTLING INJECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to improvements in rocket engines and more particularly it pertains to a new and improved rocket engine injector assembly and thrust chamber.

In the prior art there have been many attempts to provide a highly efficient and stable rocket engine which can maintain a constant pressure in the combustion chamber and a constant mixture ratio of propellants over a wide thrust range for all degrees of throttling. While a measure of success has been achieved, none have been fully successful.

Moreover, in the future there will be a greater use of high energy propellants which produce higher temperatures and pressures than in the past. This requires a rocket engine having the above features and, in addition, a thrust chamber which is able to withstand the higher temperatures and pressures and resist erosion of the wall structure and throat pintle.

Attempts to achieve such features have resulted in systems of extreme weight, cost and complexity. Space requirements have also been excessive when compactness is the desired object.

The above disadvantages are overcome by the present invention which provides a rocket engine injector assembly that maintains a constant pressure in the combustion chamber for all degrees of throttling and a thrust chamber which can successfully withstand the high temperatures and pressures encountered as a result of using higher energy propellants.

SUMMARY OF THE INVENTION

The general purpose of this invention is to efficiently throttle rocket engine propellants over a wide thrust range. Throttling is accomplished by the motion of an annular throttle piston and deflector plate which partially covers the propellant feed orifices. Propellant shutoff is accomplished by completely covering the orifices. The injector assembly has the capability of varying the propellant flow rate and throat area simultaneously. As the propellant flow is being reduced by the reduction of the injection area due to the movement of the throttle piston and deflector plate aft, the central pintle moves forward to reduce the throat area in the nozzle. These features assure high performance and efficient propellant utilization over the entire throttle range by maintaining a constant combustion chamber pressure and proper injection characteristics, such as a constant mixture ratio. Combining a variable injector with a variable thrust chamber provides a complete system with high operational integrity, controllable combustion stability, minimum weight, cost and system complexity. The space requirement of the system is also greatly reduced.

Additionally, a thrust chamber wall and pintle has been provided, which due to their structure and materials can successfully withstand the effects of high temperatures and pressures encountered during combustion as a result of the high energy propellants being used.

OBJECTS OF THE INVENTION

An object of the present invention is the provision of a high performance rocket engine having high combustion efficiency and stability over a wide thrust range due to efficient propellant utilization which results from maintaining a constant pressure in the combustion chamber for all degrees of throttling.

Another object is to provide a rocket engine having a compact thrust chamber assembly with maximum cooling due to materials which can successfully withstand the effects of high temperatures and pressures encountered as a result of using high energy propellants.

A further object of the invention is the provision of means for maintaining high efficiency by keeping the combustion chamber pressure constant over a wide thrust range for all degrees of throttling by varying the propellant flow rate and the throat area of the nozzle simultaneously.

Still another object is to provide a rocket engine which maintains a constant mixture ratio over the entire range of flow rates, is simple in operation, and decreases the weight, space and cost requirements of the system.

Other objects, advantages and novel features of the invention will become apparent from the following detailed description of the invention when considered in conjunction with the accompanying drawings.

DETAILED DESCRIPTION OF THE PREFERRED EMBODIMENTS

Figure 1:
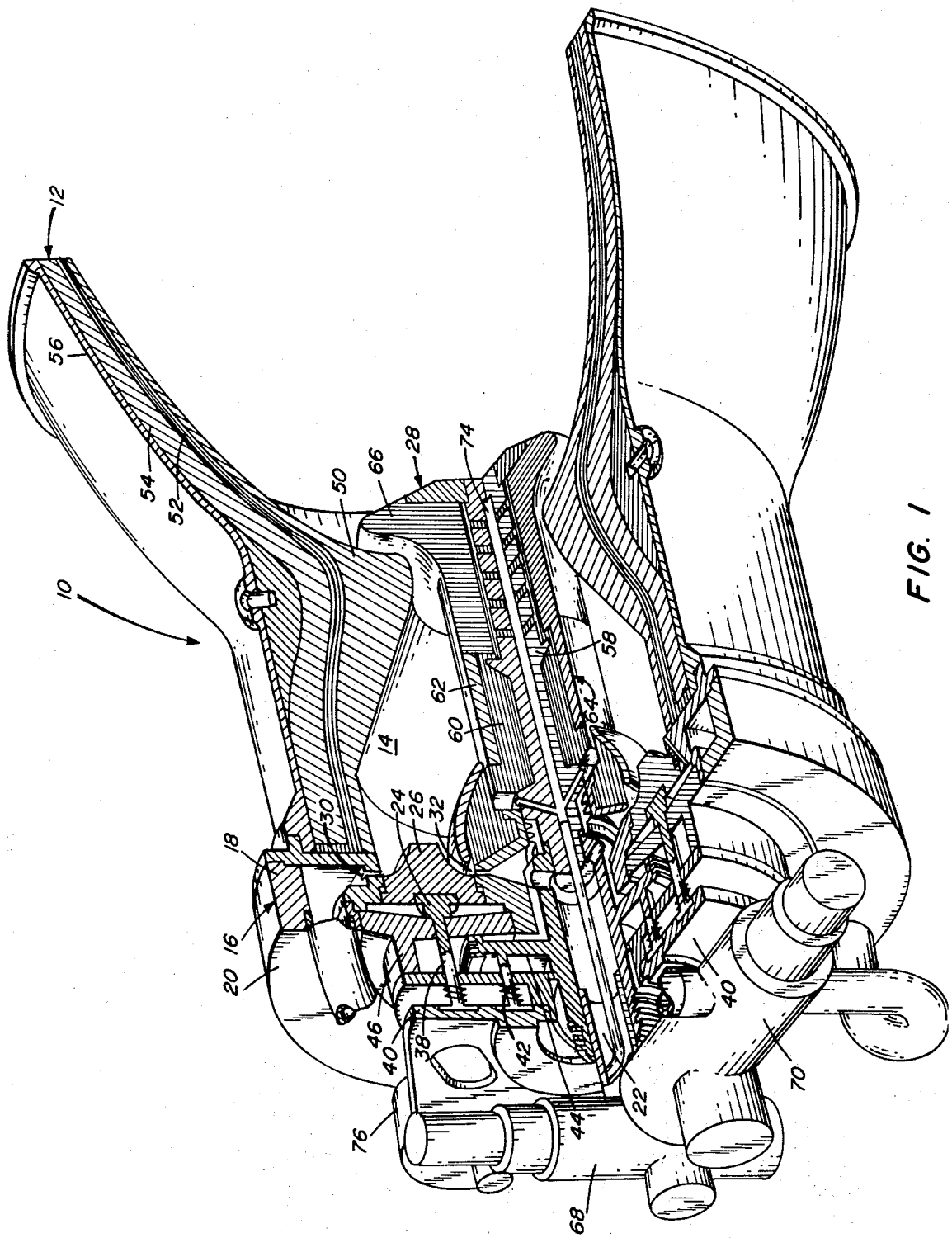
FIG. 1 is a perspective view, partially in section, of a preferred embodiment of the invention.
Figure 2:
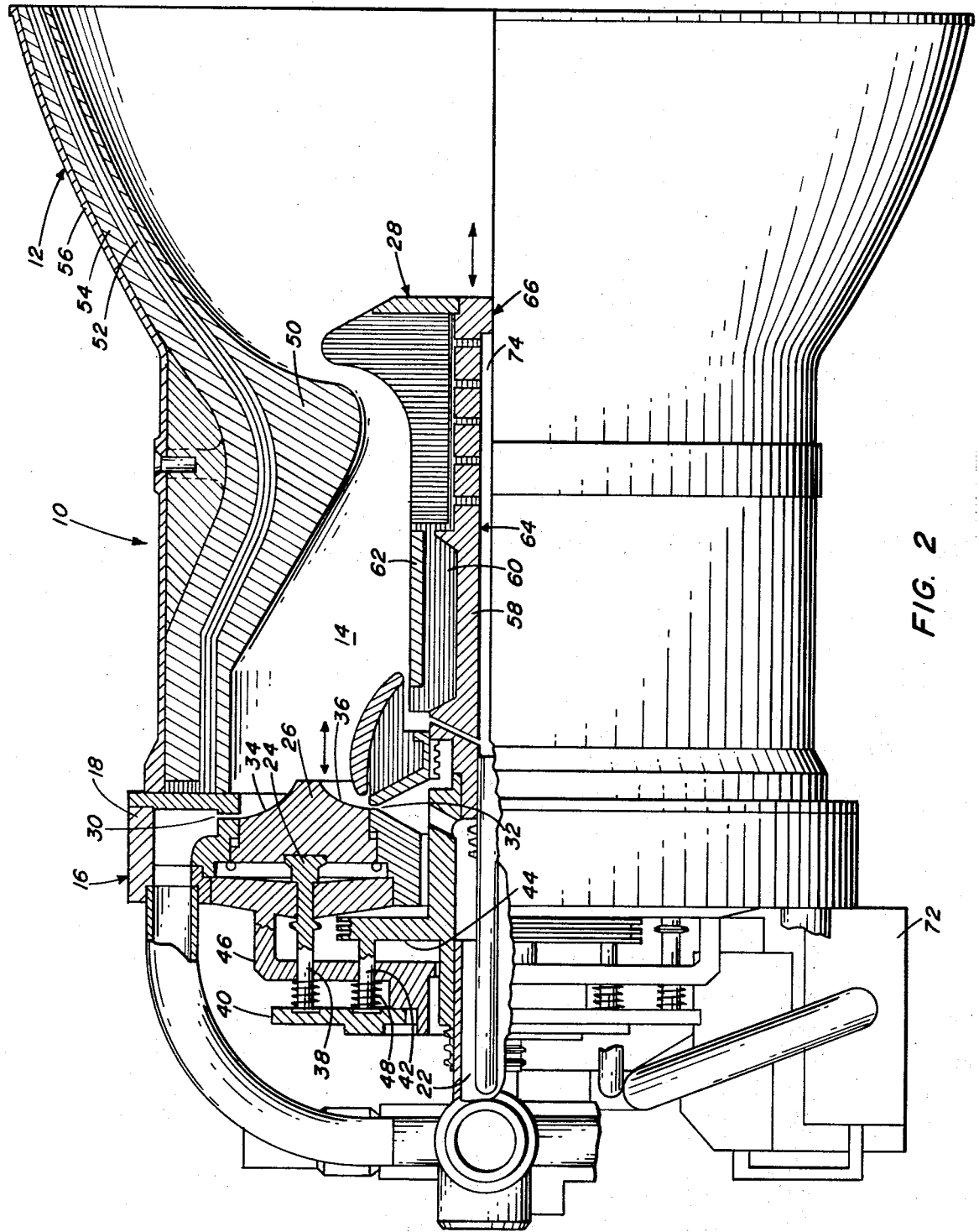
FIG. 2 illustrates a side elevation, partly in section, of the invention shown in FIG. 1.

Referring in detail to FIGS. 1 and 2 of the drawings, a bipropellant rocket engine is illustrated having an ablative thrust chamber 10, an expansion-deflection exhaust nozzle 12 and a combustion chamber 14. At the head end of the combustion chamber is an injector assembly 16 composed of fixed and movable portions. The fixed portions are a peripheral oxidizer manifold 18, a main backplate assembly 20 and a central fuel manifold 22. The movable portions are the combination annular throttle piston 24 and propellant deflector plate 26 which move in a direction opposite to a central throat pintle 28, which is coaxially arranged in thrust chamber 10. The deflector plate 26 is located on the front of throttle piston 24 and has two annular concave deflector surfaces 34 and 36 (FIG. 2) formed thereon.

The propellants are injected through circumferentially spaced oxidizer injection slots 30 and fuel injection slots 32 and flow over the deflector plate 26 which is composed of the concave oxidizer deflector surface 34 and the concave fuel deflector surface 36. The propellants may be two liquids or they may be a liquid oxidizer and a semi-liquid fuel such as metallized fuel. Upon demand, throttling is accomplished by the movement aft of the annular deflector plate 26 and its attached guide posts 38. Simultaneously with the displacement of the deflector plate 26, the throat pintle 28 moves forward to reduce the throat area of the exhaust nozzle 12.

The displacement of the annular piston 24 and the throttle pintle 28 is controlled by a motor driven cam gear 40 attached to the back of the injector assembly 16. The face of the gear contains machined-in ramps (inclined planes or cams) which are in direct contact with guide posts 38 attached to the back of the throttle piston 24 and guide posts 42 attached to a pintle crown 44. The posts protrude through a support housing 46 on the back of the injector assembly 16. Four posts are utilized in both the throat pintle and annular throttle piston, but this number is not critical. An adequate length to diameter ratio (L/D) of the bearing surface of the guide posts 38 and 42 has been allowed, to preclude the possibility of cocking and binding. As the driven cam gear 40 rotates, the throttle piston 24 and throat pintle 28 are displaced as a result of the cam action between the guide posts 38 and 42 and the ramps on the face of the gear 40. The ends of the guide posts 38 and 42 contain ball bearings to minimize friction and are spring loaded, as seen at 48, which keeps them in positive contact with the gear face. The slope of the annular piston ramps and pintle ramps are opposite since the throttle piston 24 and throat pintle 28 move in opposite directions. In addition, the slope of the throat pintle ramps is steeper than those of the throttle piston, since the pintle 28 requires a larger displacement for chamber pressure modulation. The advantage of this system is that both thrust and chamber pressure can be calibrated and mechanically adjusted during testing.

To minimize the actuation force the injector throttle piston 24 is pressure balanced by the combustion gases which are ducted behind it through holes (not shown) in the injector face. The throat pintle 28 is pressure balanced by the fuel feed pressure which acts on the aft face of the pintle crown 44.

The injector piston 24, the fuel manifold 22 and the oxidizer manifold 18 are fabricated from Nickel-A. The structural support on the back of the injector assembly 16 is made from Inconel-718. The bearing support housing, gears, springs, and bellows are fabricated from 300 series stainless steel.

The nozzle 12 and combustion chamber 14 use an ablative thrust chamber design, to better resist combustion heat and pressure, which is a composite structure, consisting of an inner layer 50 formed of a graphite base, high erosion resistant, combustion zone material, e.g., Carbitex, which is a graphite cloth material that has been graphitized, having trace impurities; an intermediate layer 52 formed of a graphite base insulator, e.g., Grafoil, which is a flexible form of pyrolytic graphite, having trace impurities; and a silica phenolic, e.g., Refrasil, in the outer region 54 encased in a metal shell 56 of Inconel 718. Compatible gas side wall thermal conditions are effected by fuel-rich (reduced flame temperature) peripheral combustion zone gases generated by an unbalanced injector technique. The injector assembly 16 is fabricated of Nickel-A and Inconel 718, and is welded to the thrust chamber shell 56. Provision for an acoustic cavity combustion oscillation damper is inherent in the injector design.

The design of throat pintle 28 is also a composite structure consisting of a Columbium high temperature alloy (WC-129-Y) center body 58, with a Grafoil intermediate layer 60, and a Carb-I-Tex 700 outer layer 62 in the cylindrical region 64. This structure is described with greater particularity in a copending application, Ser. No. 24,900 in the names of Stanislaw Andrysiak and Ronald F. McKenna, filed on Mar. 24, 1970 and assigned to the assignee of the present application now U.S. Pat. No. 3,712,063. The plug portion 66 consists of stacked pyrolytic graphite wafers with spiral formed coolant passages. Both the plug portion 66 and the cylindrical region 64 of the central throat pintle 28 are gas film cooled with fuel-rich gases from a pressurization system gas generator (not shown). This cooling gas is ducted through a central passage 74 in the pintle 28.

Explosively actuated fuel and oxidizer propellant valves 68 and 70 are mounted on the injector manifold inlet tubes. A pilot-operated hot gas valve 72 is utilized to control the pintle coolant. An electric motor drive control 76 drives the cam gear 40.

OPERATION

In operation, oxidizer enters the outer manifold 18 and fuel enters the inner manifold 22. The propellants are injected through orifices 30 and 32 and flow over the deflector plate 26 which is composed of the concave oxidizer deflector 34 and the concave fuel deflector 36. As the propellants flow over the deflectors they are spread and turned through an angle. The propellants leave the deflectors, spread out to form thin circumferential sheets, impinge as sheets, combust and produce thrust. The structure and operation of the deflector plate is described with greater particularity in a copending application, Ser. No. 24,901 in the name of C. M. Schmidt, Frank Bond and Ronald F. McKenna filed on Mar. 24, 1970 and assigned to the assignee of the present application. Upon demand, throttling is accomplished by the displacement of the annular deflector plate 26 and its attached guide posts 38 as a result of the cam action between the guide posts 38 and the ramps on the face of the cam gear 40. As the deflector plate 26 moves it reduces the area of the orifices 30 and 32 through which both the fuel and oxidizer pass, respectively. Propellant shutoff is accomplished at the injector face by completely covering the orifices which may be round or slotted rectangular holes or annuli in order to maintain a constant mixture ratio of propellants. Simultaneously with the displacement of the deflector plate 26, the throat pintle 28 also moves, in an opposite direction due to the opposite incline of the ramps on the face of the cam gear 40. As the propellant flow is being reduced by the reduction of the injection area due to the deflector plate 26 moving aft, the throat pintle 28 moves forward to reduce the throat area in the nozzle 12. The movement of the pintle 28 is calibrated so that as propellant flow is reduced the throat area of nozzle 12 is proportionally reduced so as to maintain a relatively constant pressure in the combustion chamber. Therefore, this joint movement of the deflector plate 26 and throat pintle 28 causes an engine thrust fall off without any change in the combustion chamber pressure. The method of operation permits the highest amount of energy extraction from the propellants in a given system and therefore operates in the most efficient manner over the entire throttle range.

Obviously many modifications and variations of the present invention are possible in the light of the above teachings.

What is claimed is:

1. A bipropellant rocket engine comprising an injector assembly and thrust chamber:

said injector assembly including an axially moveable annular deflector plate having two annular concave deflector surfaces in the thrust chamber over which propellants flow and are formed into circumferential sheets, and a central pintle coaxially arranged in said thrust chamber and being formed partially of pyrolytic graphite in order to withstand the high temperatures and pressures of combustion;

said thrust chamber including a combustion chamber and an exhaust nozzle; and means to actuate said deflector plate and said pintle to vary the thrust of the rocket engine by simultaneously varying the propellant flow rate and the throat area of said exhaust nozzle in order to maintain the pressure in the combustion chamber constant for all degrees of throttling.

2. A rocket engine according to claim 1 wherein:

the wall structure of said thrust chamber is a composite structure formed of two inner layers of graphite base materials and an outer layer of a silica phenolic; and the centerbody of said pintle is formed of Columbium in order to withstand the high temperatures and pressures encountered in the combustion of high energy propellants.

3. A rocket engine according to claim 2 wherein said injector assembly further includes circumferentially spaced fuel injection slots and oxidizer injection slots, each slot being rectangular in cross section, whereby as the deflector plate is actuated to decrease the propellant flow rate and partially cover said injection slots, a constant mixture ratio of propellants is maintained.

4. A rocket engine according to claim 3 wherein said actuation means include a cam gear and a plurality of guide posts, said cam gear having oppositely inclined ramps which actuate said guide posts forward and aft of the rocket engine, said guide posts being connected to said deflector plate and said throat pintle, whereby actuation of said guide posts by said cam gear moves said deflector plate and said throat pintle in opposite directions to simultaneously vary the propellant flow rate and throat area of the nozzle to maintain the pressure in the combustion chamber constant for all degrees of throttling.

5. A bipropellant rocket engine comprising an injector assembly and thrust chamber:

said injector assembly consisting of an annular deflector plate over which propellants flow and are formed into circumferential sheets, and a central pintle coaxially arranged in said thrust chamber and being formed partially of pyrolytic graphite with a centerbody made of Columbium in order to withstand the high temperatures and pressures of combustion;

said thrust chamber including a combustion chamber and exhaust nozzle, the wall structure of said thrust chamber being a composite structure formed of two inner layers of graphite base materials and an outer layer of a silica phenolic in order to withstand the high temperatures and pressures encountered in the combustion of high energy propellants; and means to actuate said deflector plate and said pintle to vary the thrust of the rocket engine by simultaneously varying the propellant flow rate and the throat area of said exhaust nozzle to maintain the pressure in the combustion chamber constant for all degrees of throttling.

6. A rocket engine according to claim 5 wherein:

said injector assembly further includes two concave deflector surfaces formed on the face of said annular deflector plate over which propellants flow and are formed into circumferential sheets; and circumferentially spaced fuel injection slots and oxidizer injection slots, each slot being rectangular in cross section, whereby as the deflector plate is actuated to decrease the propellant flow rate and partially cover said injection slots, a constant mixture ratio of propellants is maintained.

7. A rocket engine according to claim 6 wherein said actuation means include a cam gear and a plurality of guide posts, said cam gear having oppositely inclined ramps which actuate said guide posts forward and aft of the rocket engine, said guide posts being connected to said deflector plate and said throat pintle, whereby actuation of said guide posts by said cam gear moves said deflector plate and said throat pintle in opposite directions to simultaneously vary the propellant flow rate and throat area of the nozzle to maintain the pressure in the combustion chamber constant for all degrees of throttling.

* * * * *